(12) United States Patent
Eum et al.

(10) Patent No.: US 8,391,779 B2
(45) Date of Patent: Mar. 5, 2013

(54) REPEATER AND METHOD FOR PROCESSING SIGNAL, AND METHOD FOR CONVERTING FREQUENCY THEREOF

(75) Inventors: Ho Min Eum, Daejeon (KR); Hyoung Soo Lim, Daejeon (KR); Yong Tae Lee, Daejeon (KR); Heung Mook Kim, Daejeon (KR); Jong Soo Lim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 403 days.

(21) Appl. No.: 12/746,921

(22) PCT Filed: Oct. 10, 2008

(86) PCT No.: PCT/KR2008/005979
§ 371 (c)(1),
(2), (4) Date: Jun. 8, 2010

(87) PCT Pub. No.: WO2009/075468
PCT Pub. Date: Jun. 18, 2009

(65) Prior Publication Data
US 2010/0265997 A1 Oct. 21, 2010

(30) Foreign Application Priority Data
Dec. 11, 2007 (KR) .......... 10-2007-0128433

(51) Int. Cl.
*H04B 7/15* (2006.01)
*H04B 7/00* (2006.01)

(52) U.S. Cl. ...... 455/11.1; 455/22; 455/63.1; 455/114.2

(58) Field of Classification Search ............... 455/11.1, 455/7, 14, 24, 22, 20, 501, 63.1, 67.13, 570, 455/114.2, 74, 126, 13.1; 375/214, 215, 375/376
See application file for complete search history.

(56) References Cited

U.S. PATENT DOCUMENTS

| | | | | |
|---|---|---|---|---|
| 6,697,603 | B1* | 2/2004 | Lovinggood et al. | 455/13.1 |
| 7,844,219 | B2* | 11/2010 | Park et al. | 455/11.1 |
| 2008/0205661 | A1* | 8/2008 | Kim et al. | 381/66 |
| 2008/0267266 | A1 | 10/2008 | Kim et al. | |
| 2009/0073916 | A1* | 3/2009 | Zhang et al. | 370/315 |

FOREIGN PATENT DOCUMENTS

| | | |
|---|---|---|
| KR | 2007-0039390 A | 4/2007 |
| KR | 100805815 B1 | 2/2008 |
| WO | WO-2006/115320 A1 | 11/2006 |
| WO | WO-2008/069592 A1 | 6/2008 |

* cited by examiner

*Primary Examiner* — John J Lee
(74) *Attorney, Agent, or Firm* — Rabin & Berdo, P.C.

(57) ABSTRACT

A repeater converts a frequency of a received signal based on a local oscillating frequency and transmits a transmitting signal of a frequency that is different from the frequency of the received signal. Here, the local oscillating frequency includes a local oscillating error that may be different in a plurality of repeaters. Accordingly, the repeater cancels the local oscillating frequency error itself in a frequency conversion so that transmitting frequencies between the plurality of repeaters may be identical.

18 Claims, 6 Drawing Sheets

REPEATER AND METHOD FOR PROCESSING SIGNAL, AND METHOD FOR CONVERTING FREQUENCY THEREOF

TECHNICAL FIELD

The present invention relates to a repeater a method for processing signals, and a method for converting a frequency thereof. More particularly, the present invention relates to a method for processing signals to minimize a frequency error between output signals of a plurality of repeaters that use a different frequency from that of a transmitting signal transmitted from a main transmitter.

The present invention was supported by the IT R&D program of MIC/IITA [2006-S-016-02, Development of Distributed Translator Technology for Terrestrial DTV].

BACKGROUND ART

In general, repeaters are installed in areas in which signals transmitted from a main transmitter are weak in order to solve unstable reception and expand the transmission range of the signals.

When receiving a signal from the main transmitter, the repeater frequency down-converts the received signal to an intermediate frequency signal based on a local oscillating frequency and up-converts to the intermediate frequency signal based on the local oscillating frequency to an output frequency.

The repeaters use the local oscillating frequency when frequency converting. However, each local oscillating frequency of the repeaters includes a local oscillating frequency error that is different from an ideal value. In this case, when an output frequency of the repeater is different from its input frequency, the local oscillating frequency error is included in a transmitting signal. Since the local oscillating frequency errors have a different value by each repeater, if the transmitting signal includes the local oscillating frequency error, the output frequencies of the transmitting signals are different between the repeaters.

As a result, the errors between the output frequencies of the transmitting signals between the repeaters have a negative effect on reception performance of a receiving apparatus located in an area where areas of repeaters are overlapped In order to reduce the errors between the output frequencies of the transmitting signals between the repeaters, the same local oscillating frequency should be used in the plurality of repeaters or the repeaters should cancel the local oscillating frequency errors themselves.

To provide the same local oscillating frequency to the plurality of repeaters, generally, a GPS signal processed through a PLL (phase-locked loop) is provided to each repeater as the local oscillating frequency. This allows the local oscillating frequency of each repeater to be the same and then it is possible to minimize the errors between the output frequencies of the transmitting signals.

However, on average, the output frequency of the repeater becomes stable while a momentary change in the output frequency, that is, a frequency jitter, is caused when the GPS signal is generated as the local oscillating frequency. Accordingly, the errors between the output frequencies of the repeaters may momentarily become large.

The above information disclosed in this Background section is only for enhancement of understanding of the background of the invention and therefore it may contain information that does not form the prior art that is already known in this country to a person of ordinary skill in the art.

DISCLOSURE OF INVENTION

Technical Problem

The present invention has been made in an effort to provide a repeater having an advantage of minimizing a frequency error between output signals of repeaters, a signal process method, and a frequency converting method for the repeater.

Technical Solution

An exemplary embodiment of the present invention provides a method for a repeater to process a received signal and transmit a transmitting signal. The method includes: generating a first frequency and a second frequency for frequency conversion based on a local oscillating frequency that includes a local oscillating error; converting the received signal to a first intermediate frequency signal based on the first frequency; removing a frequency offset from the first intermediate frequency signal; generating an intermediate canceling frequency to cancel the local oscillating frequency based on the frequency offset; converting the signal from which the frequency offset is removed into a second intermediate frequency signal based on the intermediate canceling frequency; and generating the transmitting signal by up-converting the second intermediate frequency and transmitting the transmitting signal.

Another exemplary embodiment of the present invention provides a repeater for processing a received signal and transmitting a transmitting signal. The repeater includes: a frequency generator for generating a first frequency for frequency intermediate-conversion and a second frequency for frequency up-conversion based on a local oscillating frequency that includes a local oscillating error; a down-converter for converting the received signal of a first wireless frequency into a first intermediate frequency signal based on the first frequency for the frequency intermediate-conversion and outputting the same; a digital signal processor for generating an intermediate canceling frequency to cancel the local oscillating frequency error from a frequency offset of the received signal and converting the first intermediate frequency signal into a second intermediate frequency signal based on the intermediate canceling frequency; an up-converter for converting the second intermediate frequency signal into the transmitting signal of a second wireless frequency based on the second frequency for the frequency up-conversion; and a transmitting antenna for transmitting the transmitting signal of the second wireless frequency.

Yet another embodiment of the present invention provides a method for converting a frequency in a repeater in which a receiving frequency is different from a transmitting frequency. The method includes: generating a first frequency for frequency intermediate-conversion and a second frequency for frequency up-conversion based on a local oscillating frequency that includes a local oscillating error; down-converting the receiving frequency into a first intermediate frequency based on the first frequency for frequency intermediate-conversion; converting the first intermediate frequency into a second intermediate frequency based on an intermediate canceling frequency to cancel the local oscillating frequency error; and up-converting the second intermediate frequency into the transmitting frequency based on the second frequency for frequency up-conversion, wherein the up-converting includes removing the local oscillating frequency error.

Advantageous Effects

According to an exemplary embodiment of the present invention, a frequency error of a local oscillator is cancelled from a repeater, thereby minimizing frequency errors between transmitting signals from a plurality of repeaters.

MODE FOR THE INVENTION

Figure 1:
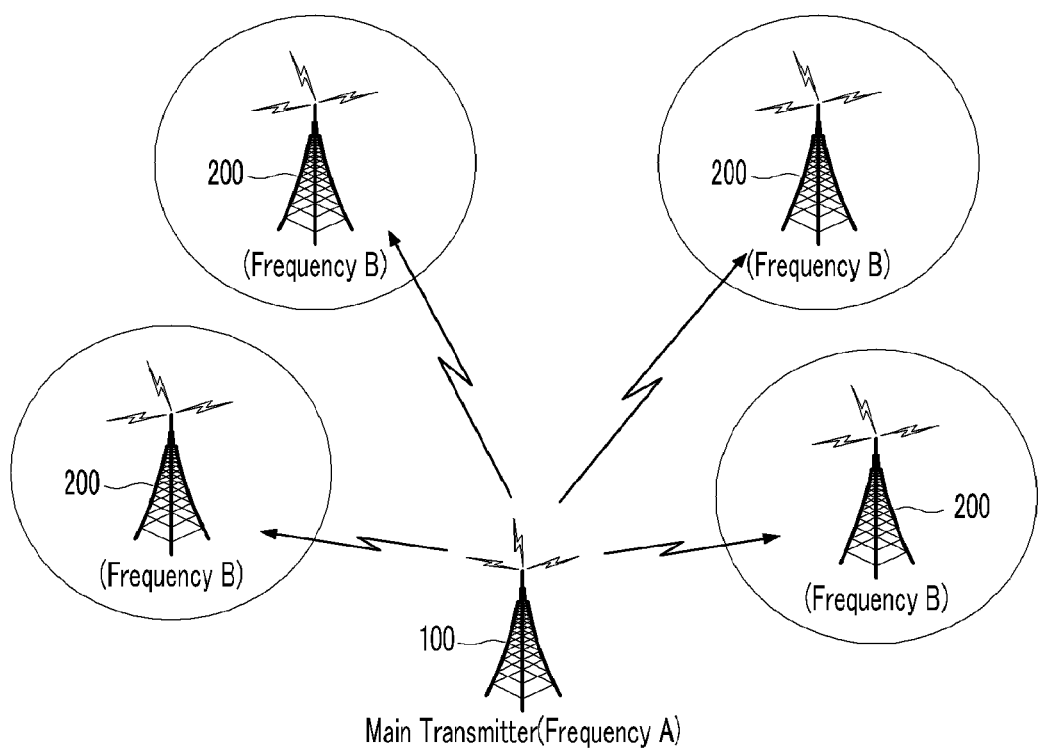
FIG. 1 schematically shows a digital broadcasting system according to the present invention.

In the following detailed description, only certain exemplary embodiments of the present invention have been shown and described, simply by way of illustration.

As those skilled in the art would realize, the described embodiments may be modified in various different ways, all without departing from the spirit or scope of the present invention.

Accordingly, the drawings and description are to be regarded as illustrative in nature and not restrictive. Like reference numerals designate like elements throughout the specification.

Throughout this specification and the claims which follow, unless explicitly described to the contrary, the word "comprising" and variations such as "comprises" will be understood to imply the inclusion of stated elements but not the exclusion of any other elements. Also, the terms of a unit, a device, and a module in the present specification represent a unit for processing a predetermined function or operation, which can be realized by hardware, software, or a combination of hardware and software.

A repeater, a signal processing method, and a frequency converting method according to an exemplary embodiment of the present invention will be described with reference to the drawings.

FIG. 1 schematically shows a digital broadcasting system according to the present invention.

As shown in FIG. 1, the digital broadcasting system includes a main transmitter 100 and a plurality of repeaters 200.

The main transmitter 100 transmits a transmitting signal through a transmission frequency (e.g., frequency A). The plurality of repeaters 200 respectively receive the transmitting signal transmitted from the main transmitter 100, and respectively transmit signals received through a frequency (e.g., frequency B) that is different from the frequency of the main transmitter 100. Here, each signal received by the plurality of repeaters 200 will be denoted as "a received wireless frequency signal", and each signal transmitted from the plurality of repeaters 200 will be denoted as "a transmitting wireless frequency signal".

The plurality of repeaters 200 convert the received wireless frequency signal into an intermediate frequency signal by performing down-conversion on the frequency of the received wireless frequency signal and convert the intermediate frequency signal into a baseband signal by performing digital signal processing. Then, the plurality of repeaters 200 frequency up-convert the baseband signal to an intermediate frequency signal by performing digital signal processing on the baseband signal, and then frequency up-convert the up-converted intermediate frequency signal so as to transmit a transmission wireless frequency signal.

The plurality of repeaters 200 mix the received wireless frequency signal with a local oscillating frequency for the frequency down-conversion to generate the intermediate frequency signal, and mix the intermediate frequency signal with a local oscillating frequency for the frequency up-conversion to generate the transmission wireless frequency signal. The local oscillating frequencies include a frequency error. Each local oscillating frequency error has a different value by the plurality of repeaters 200.

Therefore, the plurality of repeaters 200 according to the exemplary embodiment of the present invention respectively cancel the local oscillating frequency error themselves so that frequencies of the transmitting wireless signals from the plurality of repeaters 200 are the same.

Next, a first exemplary embodiment of the present invention for canceling the local oscillating frequency error will be described with reference to FIGS. 2 to 4.

Figure 2:
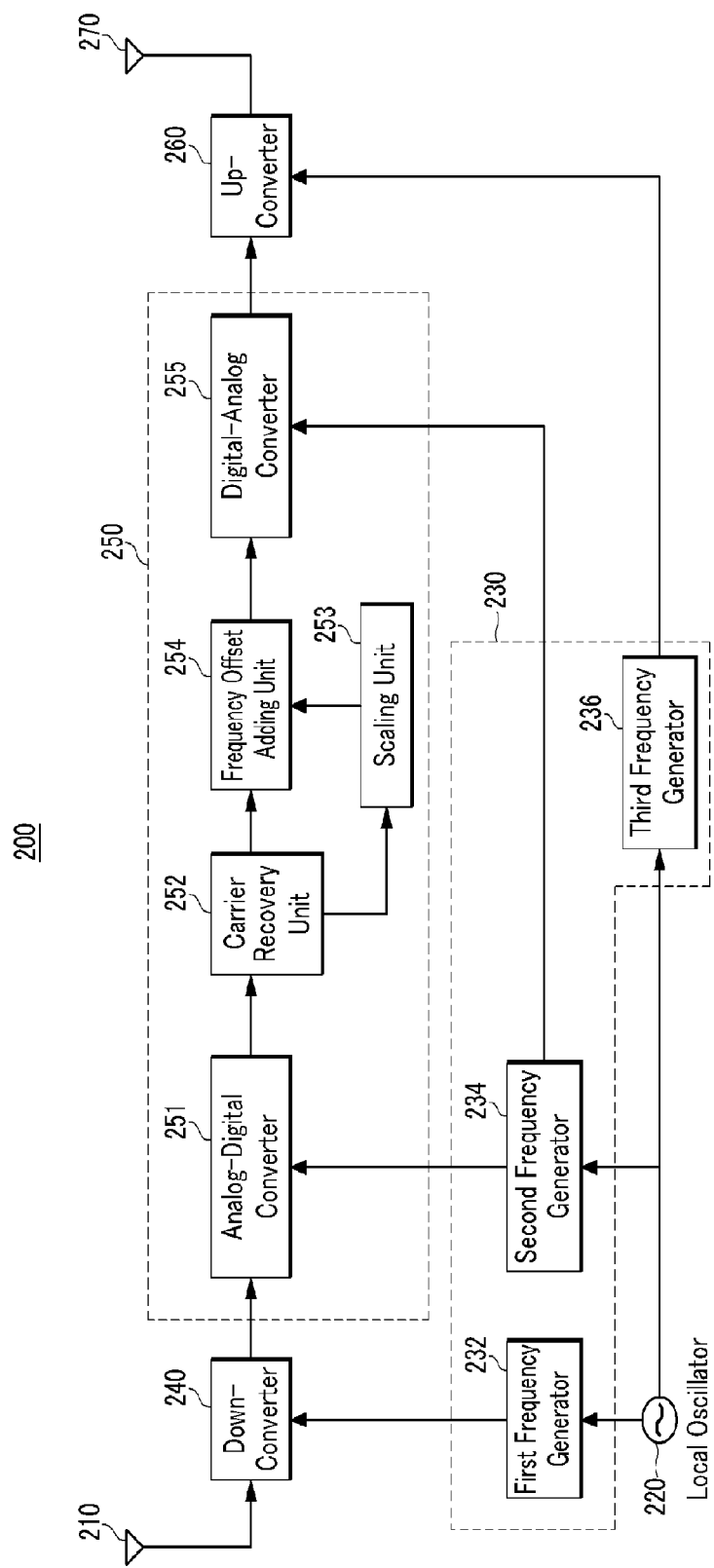
FIG. 2 shows a configuration block diagram of a repeater according to an exemplary embodiment of the present invention.
Figure 3:
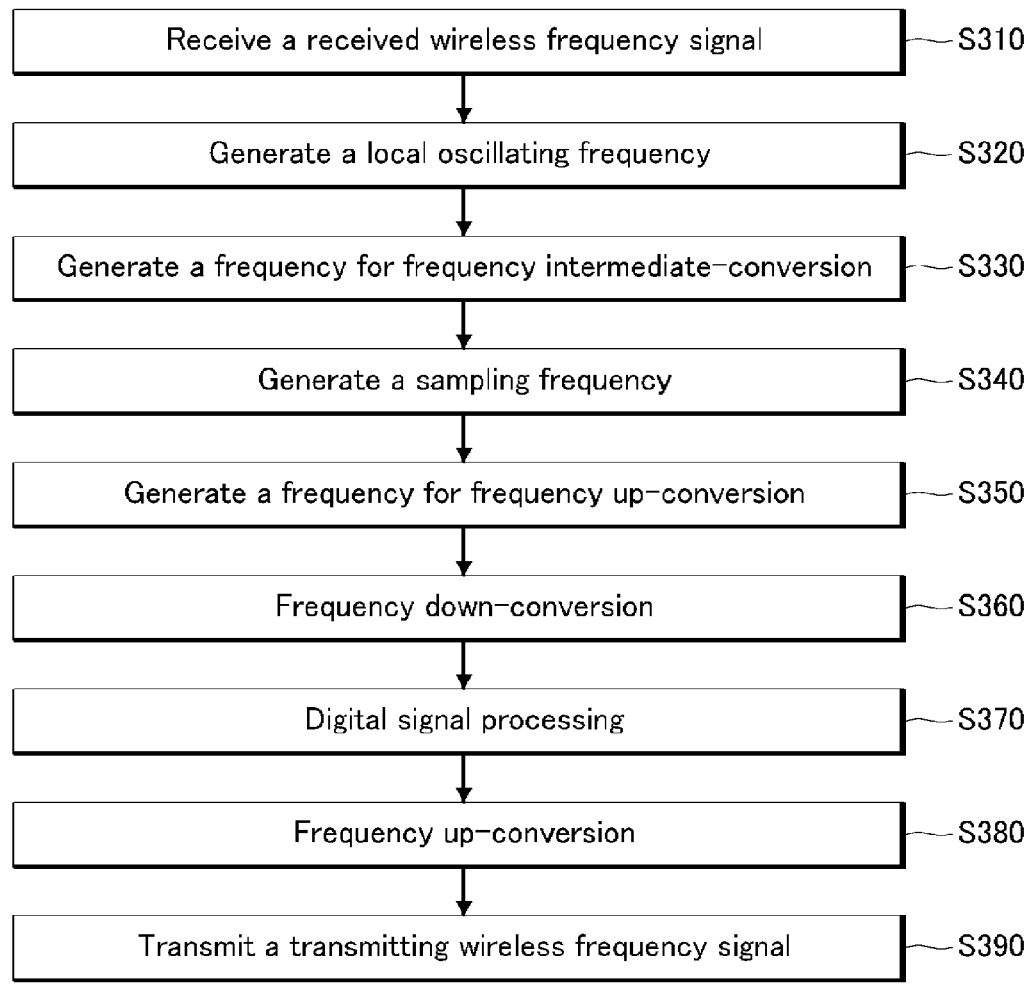
FIG. 3 shows a signal processing method of the repeater according to an exemplary embodiment of the present invention.
Figure 4:
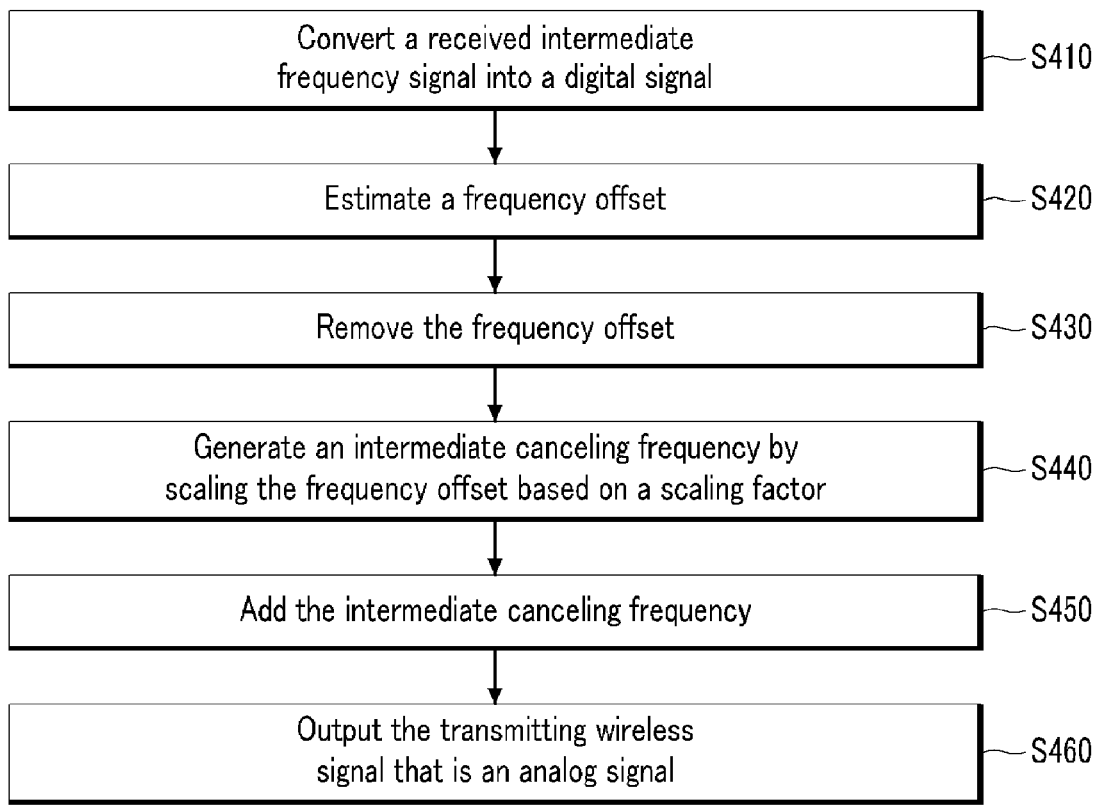
FIG. 4 shows a signal converting method for canceling a frequency error of a local oscillating frequency according to an exemplary embodiment of the present invention.

FIG. 2 shows a configuration block diagram of a repeater according to the exemplary embodiment of the present invention, FIG. 3 shows a signal process method of the repeater according to the exemplary embodiment of the present invention, and FIG. 4 shows a signal converting method for canceling the local oscillating frequency error according to the exemplary embodiment of the present invention.

As shown in FIG. 2, the repeater 200 according to the first exemplary embodiment of the present invention includes a receiving antenna 210, a local oscillator 220, a frequency generator 230, a down-converter 240, a digital signal processor 250, an up-converter 260, and a transmitting antenna 270.

Referring to FIG. 3, the receiving antenna 210 receives a received wireless frequency signal transmitted from the main transmitter 100 (S310).

The local oscillator 220 generates a local oscillating frequency and outputs the generated local oscillating frequency to the frequency generator 230 (S320). In this case, the local oscillating frequency is denoted as $f_{LO} + \Delta f_{LO}$. Here, $\Delta f_{LO}$ represents a local oscillating frequency error generated in the repeater 200. Each $\Delta f_{LO}$ generated in repeaters has a different value.

The frequency generator 230 includes first to third frequency generators 232, 234, and 236. The first frequency generator 232 generates a frequency for intermediate frequency conversion in order to down-convert the received wireless frequency signal to an intermediate frequency signal based on the local oscillating frequency ($f_{LO} + \Delta f_{LO}$), and outputs the generated frequency to the down-converter 240 (S330). The second frequency generator 234 generates a sampling frequency based on the local oscillating frequency ($f_{LO} + \Delta f_{LO}$) and outputs the sampling frequency to the down-converter 240 and the up-converter 260 (S340). The third frequency generator 236 generates a frequency for up frequency conversion based on the local oscillating frequency ($f_{LO}+\Delta f_{LO}$), and outputs the generated frequency to the up-converter 260 (S350).

The down-converter 240 frequency down-converts the received wireless frequency signal to a received intermediate frequency signal based on the frequency for intermediate frequency conversion (S360). In this case, when the frequency of the received wireless frequency signal is denoted as $f_{RFin}+\Delta f_{RFin}$ and the frequency for intermediate frequency conversion is denoted as $$(f_{RFin} - f_{IFin}) + (f_{RFin} - f_{IFin}) \times \frac{\Delta f_{LO}}{f_{LO}},$$

a frequency of the received intermediate frequency signal will be shown as the following Equation 1. Here, $f_{RFin}$ represents an ideal received wireless frequency, and $\Delta f_{RFin}$ represents a received wireless frequency error. Hereinafter, the frequency of the transmitting wireless frequency signal will be called "a transmitting wireless frequency", and the frequency of the received wireless frequency signal will be called "a received wireless frequency".

$$(f_{RFin} + \Delta f_{RFin}) - (f_{RFin} - f_{IFin}) - (f_{RFin} - f_{IFin}) \times \frac{\Delta f_{LO}}{f_{LO}} = \quad \text{(Equation 1)}$$
$$(\Delta f_{RFin} + f_{IFin}) - (f_{RFin} - f_{IFin}) \times \frac{\Delta f_{LO}}{f_{LO}}$$

The digital signal processor 250 generates a transmitting intermediate frequency signal by performing the digital signal processing to the received intermediate frequency signal and outputs the generated transmitting intermediate frequency signal to the up-converter 260 (S370). According to the first exemplary embodiment of the present invention, the digital signal processor 250 performs a function for generating an intermediate canceling frequency so that the frequency of the transmitting wireless signal is finally not under the local oscillating frequency error $\Delta f_{LO}$.

The digital signal processor 250 includes an analog-digital converter 251, a carrier recovery unit 252, a scaling unit 253, a frequency offset adding unit 254, and a digital-analog converter 255.

Referring to FIG. 4, the analog-digital converter 251 converts the received intermediate frequency signal, which is an analog signal, into a digital analog signal based on the sampling frequency and outputs the digital signal (S410). The frequency of the digital signal output from the analog-digital converter 251 will be shown as the following Equation 2.

$$\frac{\left[(\Delta f_{RFin} + f_{IFin}) - (f_{RFin} - f_{IFin}) \times \frac{\Delta f_{LO}}{f_{LO}}\right]}{F_s} \quad \text{(Equation 2)}$$

Here, the represents the sampling frequency and will be shown as the following Equation 3.

$$F_s = f_s + f_s \times \frac{\Delta f_{LO}}{f_{LO}} \quad \text{(Equation 3)}$$

The carrier recovery unit 252 estimates a frequency offset generated by the received wireless frequency and the error of the local oscillator 220 from the output signal of the analog-digital converter 251 (S420), and removes the frequency offset (S430). Then, the carrier recovery unit 252 delivers the frequency offset to the scaling unit 253.

That is, the carrier recover unit 252 removes the frequency offset from the output signal of the analog-digital converter 251 and output the same. Here, the frequency offset will be shown as the following Equation 4, and the signal output from the carrier recovery unit 252 will be shown as the following Equation 5.

$$\frac{\Delta f_{RFin} - f_{RFin} \times \frac{\Delta f_{LO}}{f_{LO}}}{F_s} \quad \text{(Equation 4)}$$

$$\frac{f_{IFin} + f_{IFin} \times \frac{\Delta f_{LO}}{f_{LO}}}{F_s} \quad \text{(Equation 5)}$$

The scaling unit 253 scales the frequency offset on the basis of a scaling factor and outputs the scaled frequency offset to the frequency offset adding unit 254 (S440). Here, the scaled frequency represents the intermediate canceling frequency.

That is, the scaling unit 253 according to the first exemplary embodiment of the present invention generates the intermediate canceling frequency that allows the local oscillating error
$\Delta f_{LO}$
to be cancelled when the transmitting intermediate frequency signal is converted into the transmitting wireless frequency signal and provides the generated intermediate canceling frequency to the frequency offset adding unit 254. Here, the intermediate canceling frequency will be shown as the following Equation 6.

$$\frac{\Delta f_{RFin} - f_{RFin} \times \frac{\Delta f_{LO}}{f_{LO}}}{F_s} \times A \quad \text{(Equation 6)}$$

Here, the A represents the scaling factor. The scaling factor DeletedTextss determined based on the ratio of the transmitting wireless frequency and the received wireless frequency $f_{RFout}/f_{RFin}$.

The frequency offset adding unit 254 adds the intermediate canceling frequency to the output signal of the carrier recovery unit 252 and outputs the same (S450). As a result, the frequency of the signal output from the frequency offset adding unit 254 will be shown as the following Equation 7.

$$f_{IFin} + f_{IFin} \times \frac{\Delta f_{LO}}{f_{LO}} + A \times \quad \text{(Equation 7)}$$
$$\frac{\left(\Delta f_{RFin} - f_{RFin} \times \frac{\Delta f_{LO}}{f_{LO}}\right)}{F_s}$$

The digital-analog converter 255 converts the output signal of the frequency offset adding unit 255, which is a digital signal, on the basis of the sampling frequency into an analog signal (S460). The transmitting intermediate frequency which is the analog signal output from the digital-analog converter 255 will be shown as the following Equation 8.

$$f_{IFin} + f_{IFin} \times \frac{\Delta f_{LO}}{f_{LO}} + A \times \left( \Delta f_{RFin} - f_{RFin} \times \frac{\Delta f_{LO}}{f_{LO}} \right) \quad \text{(Equation 8)}$$

The up-converter 260 frequency up-converts the transmitting intermediate frequency signal into the transmitting wireless frequency signal based on the frequency for up frequency conversion (S380). In this case, when the frequency for up frequency conversion is $$(f_{RFout} - f_{IFin}) + (f_{RFout} - f_{IFin}) \times \frac{\Delta f_{LO}}{f_{LO}},$$

the transmitting wireless frequency signal will be shown as the following Equation 9.

$$\left[ (f_{RFout} - f_{IFin}) + (f_{RFout} - f_{IFin}) \times \frac{\Delta f_{LO}}{f_{LO}} \right] + \quad \text{(Equation 9)}$$

$$\left[ f_{IFin} + f_{IFin} \times \frac{\Delta f_{LO}}{f_{LO}} + A \times \left( \Delta f_{RFin} - f_{RFin} \times \frac{\Delta f_{LO}}{f_{LO}} \right) \right]$$

The transmitting wireless frequency in the repeater 200 will be shown as the following Equation 10.

$$f_{RFout} + \frac{f_{RFout}}{f_{RFin}} \times \Delta f_{RFin} \quad \text{(Equation 10)}$$

From Equation 10, it is shown that the transmitting wireless frequency signal is not under the local oscillating frequency error $\Delta f_{LO}$. That is, the repeater 200 according to the first exemplary embodiment of the present invention itself cancels the local oscillating frequency error $\Delta f_{LO}$ that is different by the plurality of repeaters. Accordingly, frequencies of the transmitting wireless frequency signals output from the plurality of repeaters that receive the received wireless frequency from the main transmitter may be the same.

Meanwhile, referring to Equation 10, the transmitting wireless frequency is under the frequency error $\Delta f_{RFin}$ of the received wireless frequency signal. However, the frequency errors $\Delta f_{RFin}$ of the received wireless frequency signals in the plurality of repeaters are the same, thereby this allows the frequencies of the transmitting wireless frequency signals from the plurality of repeaters to be the same.

The transmitting antenna 260 transmits the transmitting wireless frequency signal (S390).

In the first exemplary embodiment of the present invention, it is assumed that the received intermediate frequency $f_{IFin}$ is the same as the transmitting intermediate frequency. However, it is possible for the digital signal processor 250 to generate and use a transmitting intermediate frequency that is different from the received intermediate frequency.

Now, such an exemplary embodiment will be described with reference to FIG. 5.

Figure 5:
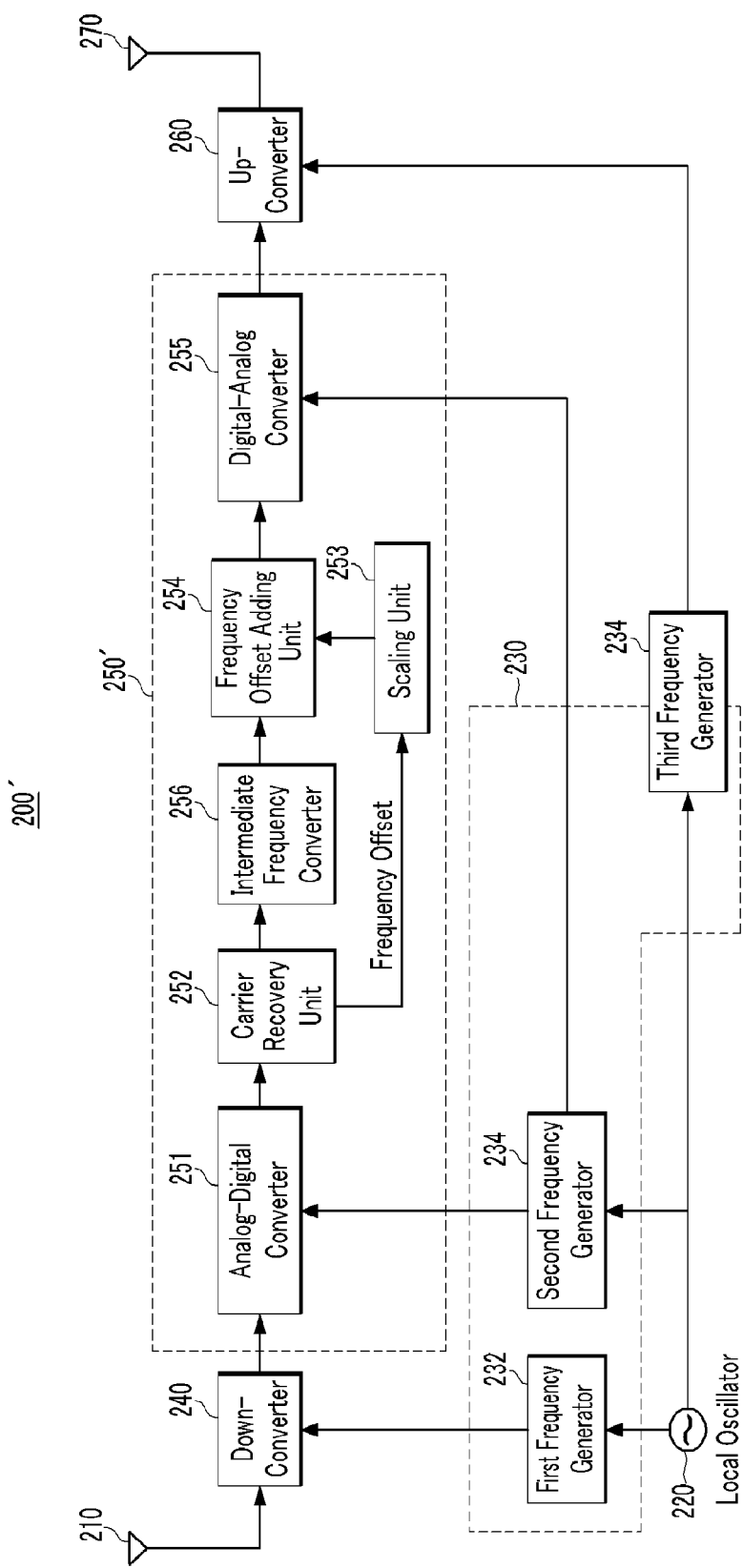
FIGS. 5 and 6 show configuration block diagrams of repeaters according to second and third exemplary embodiments of the present invention, respectively.

FIG. 5 shows a block diagram of a repeater according to a second exemplary embodiment of the present invention.

As shown in FIG. 5, the repeater 200' according to the second exemplary embodiment of the present invention is the same as that of the first exemplary embodiment, except that a digital signal processor 250' further includes an intermediate frequency converter 256.

The intermediate frequency converter 256 converts the output signal of the carrier recovery unit 252 into the transmitting intermediate frequency. When the transmitting intermediate frequency is $f_{IFout}$, the frequency of the signal output from the intermediate frequency converter 256 will be shown as the following Equation 11.

$$\frac{f_{IFout} + f_{IFout} \times \frac{\Delta f_{LO}}{f_{LO}}}{F_s} \quad \text{(Equation 11)}$$

When the intermediate frequency converter 256 converts the output signal of the carrier recovery unit 252 into the transmitting intermediate frequency, the frequencies of signals output from the frequency offset adding unit 254 and the digital-analog converter 255 will be shown as the following Equations 12 and 13, respectively.

$$f_{IFout} + f_{IFout} \times \frac{\Delta f_{LO}}{f_{LO}} + \quad \text{(Equation 12)}$$

$$\frac{A \times \left( \Delta f_{RFin} - f_{RFin} \times \frac{\Delta f_{LO}}{f_{LO}} \right)}{F_s}$$

$$f_{IFout} + f_{IFout} \times \frac{\Delta f_{LO}}{f_{LO}} + A \times \left( \Delta f_{RFin} - f_{RFin} \times \frac{\Delta f_{LO}}{f_{LO}} \right) \quad \text{(Equation 13)}$$

In addition, the transmitting wireless frequency will be shown as the following Equation 14.

$$\left[ (f_{RFout} - f_{IFout}) + (f_{RFout} - f_{IFout}) \times \frac{\Delta f_{LO}}{f_{LO}} \right] + \quad \text{(Equation 14)}$$

$$\left[ f_{IFout} + f_{IFout} \times \frac{\Delta f_{LO}}{f_{LO}} + A \times \left( \Delta f_{RFin} - f_{RFin} \times \frac{\Delta f_{LO}}{f_{LO}} \right) \right]$$

That is, the transmitting wireless frequency is the same as that of Equation 10 according to the first exemplary embodiment.

Meanwhile, in order to completely recover the received wireless frequency signal in the repeater 200', a timing offset should be compensated from the received wireless frequency signal as well as the frequency offset.

Next, an exemplary embodiment for compensating the timing offset will be described with reference to FIG. 6.

Figure 6:
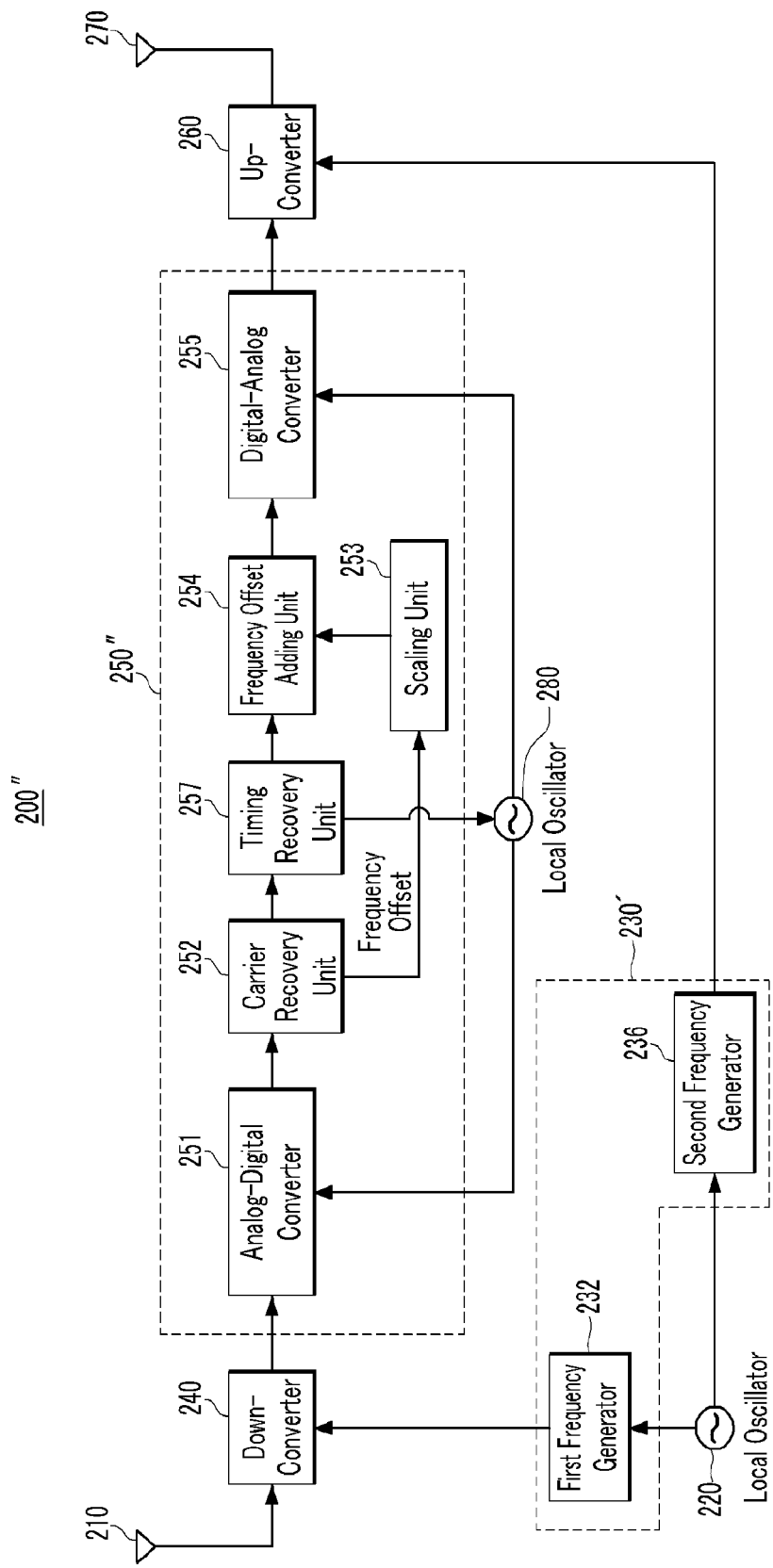

FIG. 6 shows a block diagram of a repeater according to the third exemplary embodiment of the present invention.

As shown in FIG. 6, the repeater 200" according to the third exemplary embodiment of the present invention is the same as that of the first exemplary embodiment, except for that the repeater 200" further includes a local oscillator 280 and the digital signal processor 250" further includes a timing recovery unit 257. In this case, the sampling frequency is obtained through the timing recovery unit 257. Accordingly, unlike the first exemplary embodiment, the repeater 200" of the second exemplary embodiment may not use the second frequency generator (234 in FIG. 1) for generating the sampling frequency.

The local oscillator 280 outputs the timing offset of the timing recover unit 257 according to the sampling frequency to the analog-digital converter 251 and the digital-analog converter 255. Here, if the sampling frequency recovered by the timing recover unit 257 is $F_t = f_t + \Delta f_t$, the frequency of the signal output from the analog-digital converter 251 will be shown as the following Equation 15.

$$\frac{\left[(\Delta f_{RFin} + f_{IFin}) - (f_{RFin} - f_{IFin}) \times \frac{\Delta f_{LO}}{f_{LO}}\right]}{F_t} \quad \text{(Equation 15)}$$

The frequency offset of the carrier recover unit 252 will be shown as the following Equation 16, and then the signal output from the carrier recovery unit 252 will be shown as the following Equation 17.

$$\frac{\Delta f_{RFin} - (f_{RFin} - f_{IFin}) \times \frac{\Delta f_{LO}}{f_{LO}} - f_{IFin} \times \frac{\Delta f_t}{f_t}}{F_t} \quad \text{(Equation 16)}$$

$$\frac{f_{IFin} + f_{IFin} \times \frac{\Delta f_t}{f_t}}{F_t} \quad \text{(Equation 17)}$$

The frequency of the signal output from the scaling unit 253 will be shown as the following Equation 18.

$$\left(\frac{\Delta f_{RFin} - (f_{RFin} - f_{IFin}) \times \frac{\Delta f_{LO}}{f_{LO}} - f_{IFin} \times \frac{\Delta f_t}{f_t}}{F_t}\right) \times A \quad \text{(Equation 18)}$$

Here, the scaling factor A is determined by the ratio of the difference between the transmitting wireless frequency and the transmitting intermediate frequency and the difference between the received wireless frequency and the received intermediate frequency $f_{RFout} - f_{IFout}/f_{RFin} - f_{IFin}$.

The timing recovery unit 257 estimates the timing offset that is generated by an error of the sampling frequency from the output signal of the carrier recover unit 252 and compensates the estimated timing offset.

The signal output from the timing recovery unit 256 will be shown as the following Equation 19.

$$\frac{f_{IFout} + f_{IFout} \times \frac{\Delta f_t}{f_t}}{F_t} \quad \text{(Equation 19)}$$

The frequency of the signal output from the frequency offset adding unit 254 will be shown as the following Equation 20, and the frequency of the signal output from the digital-analog converter 255 will be shown as the following Equation 21.

$$f_{IFout} + f_{IFout} \times \frac{\Delta f_t}{f_t} + A \times \Delta f_{RFin} - \quad \text{(Equation 20)}$$
$$\frac{A \times (f_{RFin} - f_{IFin}) \times \frac{\Delta f_{LO}}{f_{LO}} - A \times f_{IFin} \times \frac{\Delta f_t}{f_t}}{F_t}$$

$$f_{IFout} + f_{IFout} \times \frac{\Delta f_t}{f_t} + A \times \Delta f_{RFin} - \quad \text{(Equation 21)}$$
$$A \times (f_{RFin} - f_{IFin}) \times \frac{\Delta f_{LO}}{f_{LO}} - A \times f_{IFin} \times \frac{\Delta f_t}{f_t}$$

As a result, the frequency of the signal output from the up-converter 260, that is, the transmitting wireless frequency will be finally shown as the following Equation 22.

$$f_{RFout} + \frac{(f_{RFout} - f_{IFout})}{(f_{RFin} - f_{IFin})} \times \Delta f_{RFin} + \quad \text{(Equation 22)}$$
$$\left(f_{IFout} - \frac{(f_{RFout} - f_{IFout})}{(f_{RFin} - f_{IFin})} \times f_{IFin}\right) \times \frac{\Delta f_t}{f_t}$$

As shown in Equation 22, it is known that the transmitting wireless frequency of the signal output from the up-converter 260 is not under the local oscillating frequency error $\Delta f_{LO}$.

Therefore, the frequencies between the transmitting wireless frequency signals from the plurality of repeaters become the same.

In addition, the repeater according to the third exemplary embodiment of the present invention is realized based on the construction of the repeater according to the first exemplary embodiment of the present invention as well as that of the repeater according to the second exemplary embodiment of the present invention. In this case, the intermediate frequency converter (256 of FIG. 5) may be located between the carrier recover unit 252 and the timing recover unit 257 of the digital signal processor 250", and it is possible to derive the transmitting wireless frequency of the signal output from the up-converter 260 by applying Equations 11 to 22.

The above-described embodiments can be realized through a program for realizing functions corresponding to the configuration of the embodiments or a recording medium for recording the program in addition to through the above-described device and/or method, which is easily realized by a person skilled in the art.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:
1. A method for a repeater to process a signal, the method comprising:
  converting a received signal into a digital signal based on a local oscillating frequency that includes a local oscillating error;
  estimating a frequency offset from the digital signal;
  generating an intermediate canceling frequency to cancel the local oscillating error based on the frequency offset;
  adding the intermediate canceling frequency to a signal from which the frequency offset is removed; and converting the signal to which the intermediate canceling frequency is added into an analog signal and outputting the same as a transmitting signal.

2. The method of claim 1, further comprising:
removing a timing offset from the signal from which the frequency offset is removed.

3. The method of claim 2, wherein a frequency that is used in converting a signal into the digital signal or the analog signal is obtained based on the local oscillating frequency and the timing offset.

4. The method of claim 1, further comprising: converting a frequency of the signal from which the frequency offset is removed.

5. The method of claim 1, wherein the generating of an intermediate canceling frequency includes multiplying the frequency offset by a scaling factor, the scaling factor being determined based on the frequency of the received signal and the frequency of the transmitting signal.

6. The method of claim 1, further comprising:
generating a first conversion frequency and a second conversion frequency for frequency conversion based on the local oscillating frequency;
down-converting the received signal based on the first conversion frequency before estimating the frequency offset; and
up-converting the analog signal based on the second conversion frequency.

7. The method of claim 1, wherein the frequency of the transmitting signal is different from the frequency of the received signal.

8. A repeater for processing a signal, comprising:
an analog-digital converter for converting a received signal into a digital signal based on a local oscillating frequency that includes a local oscillating error;
a carrier recovery unit for estimating a frequency offset from the digital signal and removing the frequency offset from the digital signal;
a scaling unit for generating an intermediate canceling frequency based on the frequency offset;
a frequency offset adding unit for removing a local oscillating error from the signal from which the frequency offset is removed based on the intermediate canceling frequency; and
a digital-analog converter for converting the signal from which the local oscillating error is removed into an analog signal based on the local oscillating frequency and outputting the analog signal as a transmitting signal.

9. The repeater of claim 8, wherein the scaling unit generates the intermediate canceling frequency by multiplying the frequency offset by a scaling factor,
wherein the scaling factor is determined based on a frequency ratio of the received signal and the transmitting signal.

10. The repeater of claim 8, further comprising:
a timing recovery unit for estimating a timing offset from the signal from which the frequency offset is removed and removing the timing offset from the signal from which the frequency offset is removed.

11. The repeater of claim 10, wherein a frequency being used in converting a signal into the digital signal or the analog signal is obtained from the local oscillating frequency and information of the timing offset.

12. The repeater of claim 10, further comprising:
an intermediate frequency converter for converting a frequency of the signal from which the frequency offset is removed.

13. The repeater of claim 8, further comprising:
a first frequency generator for generating a sampling frequency based on the local oscillating frequency,
wherein the sampling frequency is used in converting a signal into the digital signal or the analog signal.

14. The repeater of claim 13, further comprising:
a second frequency generator for generating a first conversion frequency for frequency conversion based on the local oscillating frequency;
a third frequency generator for generating a second conversion frequency for frequency conversion based on the local oscillating frequency;
a down-converter for down-converting the received signal based on the first conversion frequency before estimating the frequency offset; and
an up-converter for up-converting the analog signal based on the second conversion frequency.

15. The repeater of claim 14, wherein the first conversion frequency is different from the second conversion frequency.

16. A method for converting a frequency in a repeater, the method comprising:
generating a sampling frequency based on a local oscillating frequency that includes a local oscillating error;
converting a receiving frequency of a received signal into a first frequency based on the sampling frequency;
generating an intermediate cancelling frequency to cancel the local oscillating error;
converting the first frequency into a second frequency based on the intermediate cancelling frequency; and
converting the second frequency into a third frequency based on the sampling frequency and outputting the third frequency as a transmitting frequency of a transmitting signal.

17. The method of claim 16, wherein the generating of an intermediate canceling frequency further includes multiplying the frequency offset by a scaling factor,
wherein the scaling factor is determined based on the receiving frequency and the transmitting frequency.

18. The method of claim 16, further comprising:
generating a first conversion frequency and a second conversion frequency for frequency conversion based on the local oscillating frequency,
wherein the converting of a receiving frequency of a received signal includes down-converting the receiving frequency of the received signal based on the first conversion frequency and converting the down-converted frequency into the first frequency based on the sampling frequency,
wherein the outputting includes converting the second frequency into a fourth frequency based on the sampling frequency and converting the fourth frequency into the third frequency based on the second conversion frequency.

* * * * *